(12) United States Patent
Acker

(10) Patent No.: US 9,726,520 B2
(45) Date of Patent: Aug. 8, 2017

(54) SENSOR FOR DETECTING A POSITION OF A TRANSDUCER MAGNET

(71) Applicant: Continental Teves AG & Co. oHG, Frankfurt (DE)

(72) Inventor: Heinrich Acker, Schwalbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 25 days.

(21) Appl. No.: 14/770,156

(22) PCT Filed: Feb. 24, 2014

(86) PCT No.: PCT/EP2014/053506
§ 371 (c)(1),
(2) Date: Aug. 25, 2015

(87) PCT Pub. No.: WO2014/131716
PCT Pub. Date: Sep. 4, 2014

(65) Prior Publication Data
US 2016/0003643 A1    Jan. 7, 2016

(30) Foreign Application Priority Data

Mar. 1, 2013  (DE) .......................... 10 2013 203 586

(51) Int. Cl.
*G01D 5/20* (2006.01)
(52) U.S. Cl.
CPC .................................. *G01D 5/2046* (2013.01)
(58) Field of Classification Search
USPC .... 324/207.16, 207.15, 207.13, 207.11, 200, 324/207.24, 207.17, 207.23, 173, 207.18,
(Continued)

(56) References Cited

U.S. PATENT DOCUMENTS

| 4,774,465 A | 9/1988 | Nilius |
| 5,204,621 A * | 4/1993 | Hermann ............... G01D 5/225 324/207.18 |

(Continued)

FOREIGN PATENT DOCUMENTS

| DE | 2325752 | 11/1975 |
| DE | 3518772 | 11/1986 |

(Continued)

OTHER PUBLICATIONS

Dambacher Karl Heinz; Adjuster with Displacement transducer; DE 4025101 A1; Bosch GMBH Robert; CPC:G01D5/20.*

(Continued)

*Primary Examiner* — Melissa Koval
*Assistant Examiner* — Nasima Monsur
(74) *Attorney, Agent, or Firm* — RatnerPrestia

(57) ABSTRACT

A sensor for detecting a position of a transducer magnet in a movement direction, including: —a coil carrier extending in the movement direction, —a first coil extending in the movement direction that is wound onto the coil carrier and—a second and a third coil oriented according to the first coil, which are wound onto the coil carrier such that the second and third coils accordingly form a first and second transformer with the first coil, the transformation ratio of which is dependent on the position of the transducer magnet, —wherein at least the second coil or the third coil is arranged between the coil carrier and the first coil.

11 Claims, 5 Drawing Sheets

(58) Field of Classification Search
USPC .......... 324/207.21, 207.25; 73/862.331, 121, 73/130, 514.39, 862.193
See application file for complete search history.

(56) References Cited

U.S. PATENT DOCUMENTS

| | | | |
|---|---|---|---|
| 5,973,494 | A | 10/1999 | Masreliez |
| 6,346,870 | B1 | 2/2002 | Bill |
| 6,937,129 | B2 | 8/2005 | Hsueh et al. |
| 7,317,371 | B1 | 1/2008 | Carroll |
| 7,602,175 | B2 * | 10/2009 | Mednikov .............. G01D 5/202 324/207.16 |
| 7,994,778 | B2 | 8/2011 | Kirchdoerffer |
| 8,207,749 | B2 | 6/2012 | Reime |
| 2004/0040391 | A1 | 3/2004 | May |
| 2009/0102463 | A1 * | 4/2009 | May .................... G01D 5/2013 324/207.16 |
| 2010/0237855 | A1 | 9/2010 | Turner |
| 2010/0301843 | A1 * | 12/2010 | Kronowitter ........ G01D 5/2053 324/207.25 |
| 2014/0203801 | A1 | 7/2014 | Lehmann |

FOREIGN PATENT DOCUMENTS

| | | | |
|---|---|---|---|
| DE | 4025101 | 2/1992 | |
| DE | 4128159 | 2/1993 | |
| DE | 4425903 | 3/1997 | |
| DE | 19719905 | 11/1997 | |
| DE | 19726256 | 8/1998 | |
| DE | 19718150 | 11/1998 | |
| DE | 10342473 | 5/2005 | |
| DE | 102010002505 | 9/2011 | |
| DE | 102012215940 | 3/2013 | |
| EP | 0145290 | 1/1989 | |
| EP | 0238922 | 1/1990 | |
| EP | 0707190 | 12/1998 | |
| EP | 2149784 | 2/2010 | |
| JP | 2008170360 | 7/2008 | |
| WO | 0101066 | 1/2001 | |
| WO | WO 0101066 A1 * | 1/2001 | ............. B60T 7/042 |
| WO | 03071231 | 8/2003 | |
| WO | 2007137693 | 12/2007 | |

OTHER PUBLICATIONS

Chinese Office Action dated Jul. 19, 2016 for Chinese Application No. 201480011772.3, including translation, 15 pages.
German Search Report for German Application No. 10 2013 203 586.1 mailed Jun. 5, 2013, including partial translation.
International Search Report for International Application No. PCT/EP2014/053506 mailed May 16, 2014.
German Search Report for German Application No. 10 2014 201 790.4, mailed May 19, 2015, with partial translation, 9 pages.
International Search Report for International Application No. PCT/EP2014/051936, mailed Apr. 3, 2014, 3 pages.
Chinese Office Action for Chinese Application No. 201480006946.7, dated Jun. 2, 2016, 10 pages.
Non Final Office Action for Application No. 141764,314, mailed Nov. 30, 2016, 25 pages.
Non Final Office Action for U.S. Appl. No. 14/764,314, dated May 10, 2017, 34 pages.

* cited by examiner

SENSOR FOR DETECTING A POSITION OF A TRANSDUCER MAGNET

CROSS REFERENCE TO RELATED APPLICATIONS

This application is the U.S. National Phase Application of PCT International Application No. PCT/EP2014/053506, filed Feb. 24, 2014, which claims priority to German Patent Application No. 10 2013 203 586.1, filed Mar. 1, 2013, the contents of such applications being incorporated by reference herein.

FIELD OF THE INVENTION

The invention relates to a sensor for detecting a position of a transducer magnet and to a device for actuating a brake system of a vehicle with the sensor.

BACKGROUND OF THE INVENTION

EP 238 922 B1, which is incorporated by reference, discloses a position sensor that operates on the principle of measuring linear displacement on the basis of a permanent magnetic linear contactless displacement, known as PLCD. Such a position sensor is also referred to as a linear inductive position sensor, known as a LIPS.

SUMMARY OF THE INVENTION

An aspect of the invention is an improvement over the known position sensors.

According to one aspect of the invention, a sensor for detecting a position of a transducer magnet in a direction of movement comprises:
  a coil carrier, which extends in the direction of movement,
  a first coil, which extends in the direction of movement and is wound up on the coil carrier, and
  a second and a third coil, which are aligned according to the first coil and are wound up on the coil carrier, so that the second and third coils correspondingly form with the first coil a first and a second transformer, the transformation ratio of which is dependent on the position of the transducer magnet,
  at least the second or third coil being arranged between the coil carrier and the first coil.

The sensor specified is based on the idea that the aforementioned first coil could be wound directly on the coil carrier, while the second and third coils could be wound over the first coil, when seen from the coil carrier. However, the second and third coils generally require delimiting elements, which hold the second and third coils together and define their position. For efficient use of material, these delimiting elements should be produced so as to be as thin as possible, for which reason webs would appear to be most appropriate here as delimiting elements. However, in the aforementioned setup, the webs would have to pass through the first coil and would thus restrict the space available for winding the first coil on the coil carrier. The situation is complicated further by the fact that the webs cannot be made as thin as desired, because they would otherwise be too sensitive and could be damaged during production or in use. The situation is complicated still further by the fact that the coil carrier is generally produced by an injection-molding process, in the course of which the webs must likewise have a certain thickness in order not to be damaged during production.

This is where the invention comes in, with the proposal not to wind the first coil onto the coil carrier first, but to wind the second and third coils onto the coil carrier first. In this way, the first coil can be wound not only over the second and third coils but also over the delimiting elements that can be formed by way of example as webs, whereby the delimiting elements themselves scarcely restrict the winding space of the first coil any more, or do not restrict it at all. Consequently, the overall space available for the specified sensor can be used more efficiently.

In a development of the specified sensor, the coil carrier comprises a main body which extends in the direction of movement and has a first and a second slot, which runs at least in certain regions in the circumferential direction around the direction of movement and in which the second and the third coil is correspondingly accommodated. The present development is based on the idea of using slots instead of webs as delimiting elements. Even if this involves increased material expenditure, the walls of these slots offer sufficient mechanical retention for the second and third coils and can also withstand high mechanical loads during the production of the coil carrier in comparison with the aforementioned webs.

In an additional development of the specified sensor, the second and third coils fill their corresponding slot up to an outer lateral surface of the main body, so that the second and third coils finish flush with the outer lateral surface of the main body. In this way, the first coil can be wound over the second and third coils without abrupt changes and edges.

In another development, the main body comprises a recess, which runs at least in certain regions in the circumferential direction around the direction of movement and is formed between the first slot and the second slot when viewed in the direction of movement. In this way, the material consumption for the coil carrier can be set optimally to the mechanical strength, in that the width of this recess is chosen to be just enough for the delimiting elements that are formed by the slots and the recess to be just strong enough to withstand all of the mechanical loads to be expected.

In this case, the surface of the main body should preferably be formed at an obtuse angle when considered in the direction of movement. In an alternative embodiment, the surface of the main body could also be formed as round when considered in the direction of movement.

The second coil and the third coil are preferably arranged between the coil carrier and the first coil. However, it could likewise be appropriate to arrange only one of the second and third coils between the coil carrier and the first coil and to wind the other of the two coils onto the first coil. In this case, the specified displacement sensor could be provided with an asymmetry when seen in the direction of movement that can be influenced application-dependently with the characteristic curve of the specified displacement sensor.

In an additional development of the specified sensor, the coil carrier is produced from plastic, in particular by means of an injection-molding process.

In a particular development of the specified sensor, the second and third coils are compactly wound coils in comparison with the first coil. This compact winding makes it possible to measure the flux at one location of the core, for which many windings have to be concentrated at the location concerned in comparison with the primary winding.

This can be countered by compact winding. However, compact winding necessitates mechanically strong delimiting elements that can be provided as part of the specified sensor.

In a preferred development, the specified sensor is formed as a linear inductive position sensor, known as a LIPS.

According to a further aspect of the invention, a device for actuating a brake system of a vehicle comprises a brake pedal for setting a braking force by displacing the brake pedal in a direction of movement and a sensor according to one of the preceding claims for detecting the position of the brake pedal in the direction of movement and for outputting a signal indicating the braking force to be set, in dependence on the detected position of the brake pedal.

According to a further aspect of the invention, a method for producing a specified sensor comprises winding the second and third coils onto the coil carrier and winding the first coil onto the coil carrier over the second and third coils wound onto the coil carrier.

BRIEF DESCRIPTION OF THE DRAWINGS

The properties, features and advantages of this invention that are described above and also the manner in which they can be achieved become clearer and more easily understandable in connection with the following description of the exemplary embodiments, which are explained more specifically in conjunction with the drawings, in which.

DETAILED DESCRIPTION OF THE PREFERRED EMBODIMENTS

In the figures, the same technical elements are provided with the same designations and are described only once.

Figure 1:
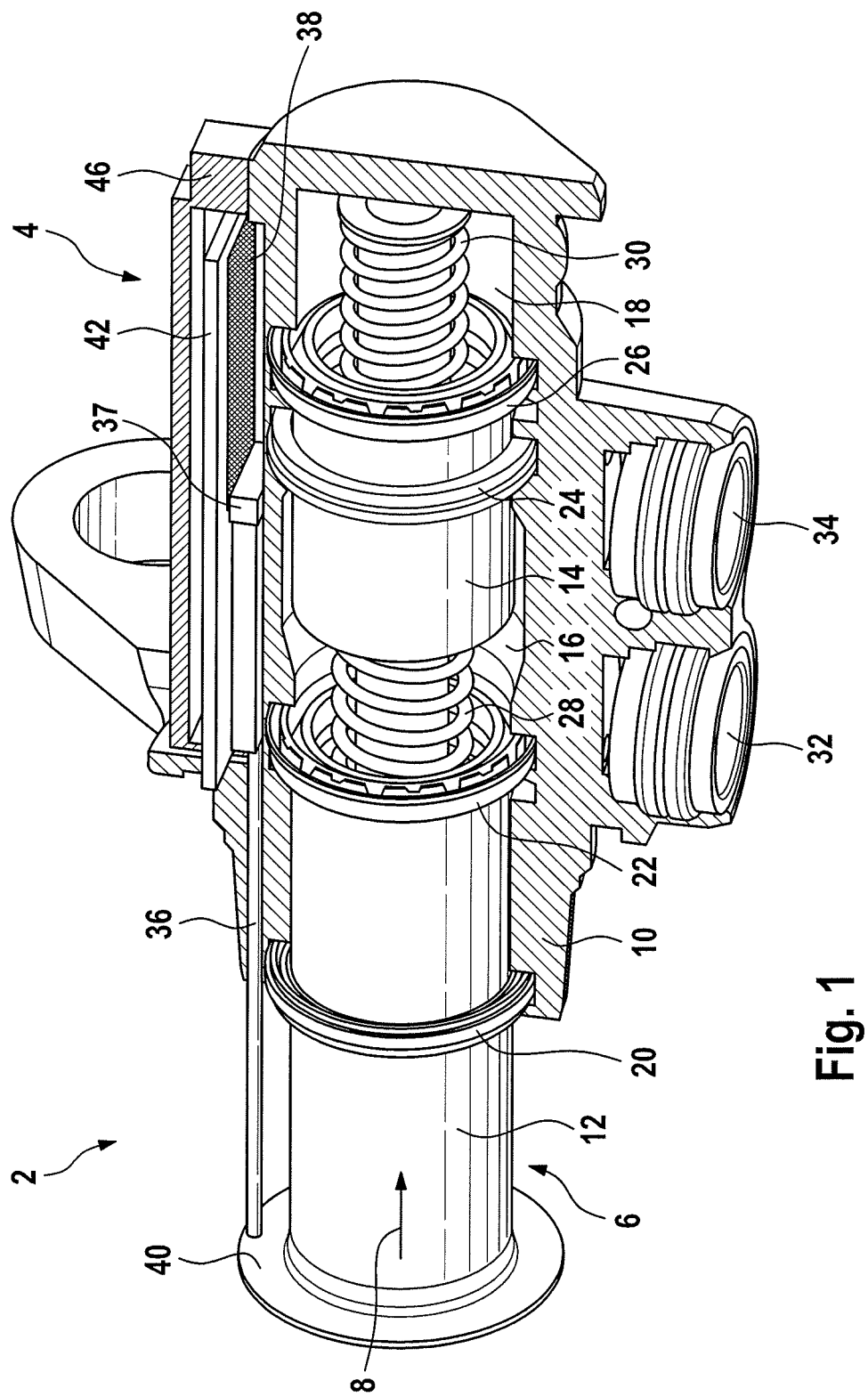
FIG. 1 shows a tandem main cylinder with a displacement sensor.

Reference is made to FIG. 1, which shows a tandem main cylinder 2 with a displacement sensor 4.

The tandem main cylinder 2 also has a pressure piston 6, which is arranged movably in a direction of movement 8 in a housing 10, the movement of the pressure piston 6 being controlled by a foot pedal that is not shown. The pressure piston 6 is itself divided into a primary piston 12 and a secondary piston 14, the primary piston 12 closing an inlet of the housing 10 and the secondary piston 12 dividing the interior space of the housing 10 into a primary chamber 16 and a secondary chamber 18. Arranged on the primary piston 12 in the region of the inlet of the housing 10 is a secondary sleeve 20, which isolates the interior space of the housing 10 from the ambient air. Seen looking into the interior space of the housing 10, the secondary sleeve 20 is followed by a primary sleeve 22, which seals off a gap between the primary piston 12 and a wall of the housing 10. A pressure sleeve 24 on the secondary piston 14 isolates the pressure of the primary chamber 16 from the pressure of the secondary chamber 18. Furthermore, a further primary sleeve 26 on the secondary piston 14 seals off a gap between the secondary piston 14 and the wall of the housing 10. The primary piston 12 is supported against the secondary piston 14 by way of a first spring 28, while the secondary piston is supported against a housing base by way of a second spring 30. The primary chamber 16 and the secondary chamber 18 can be correspondingly supplied with hydraulic fluid, not shown, by way of a first and a second connection 32, 34.

Since a person skilled in the art is familiar with the way in which a tandem main cylinder functions, it is intended to dispense with a more detailed representation of this.

The displacement sensor 4 has a test piece in the form of a slide 36 with a transducer magnet 37 at its head end, which can be pushed under a sensor circuit 38, still to be described, when considered looking into the plane of the image. For sliding the slide 36, the primary piston 12 has a flange 40, against which the slide 36 is mounted. The flange 40 and the primary piston 12 consequently together form an object to be measured, the position of which is determined by the sensor circuit 38, still to be described, of the displacement sensor 4. The sensor circuit 38 is formed by a number of conductor tracks on a wiring carrier 42, such as a lead frame, a printed circuit board or some other substrate. For protection, for example from dirt, a cover 46 may be placed on the printed circuit board 42 with the sensor circuit 38.

Figure 2:
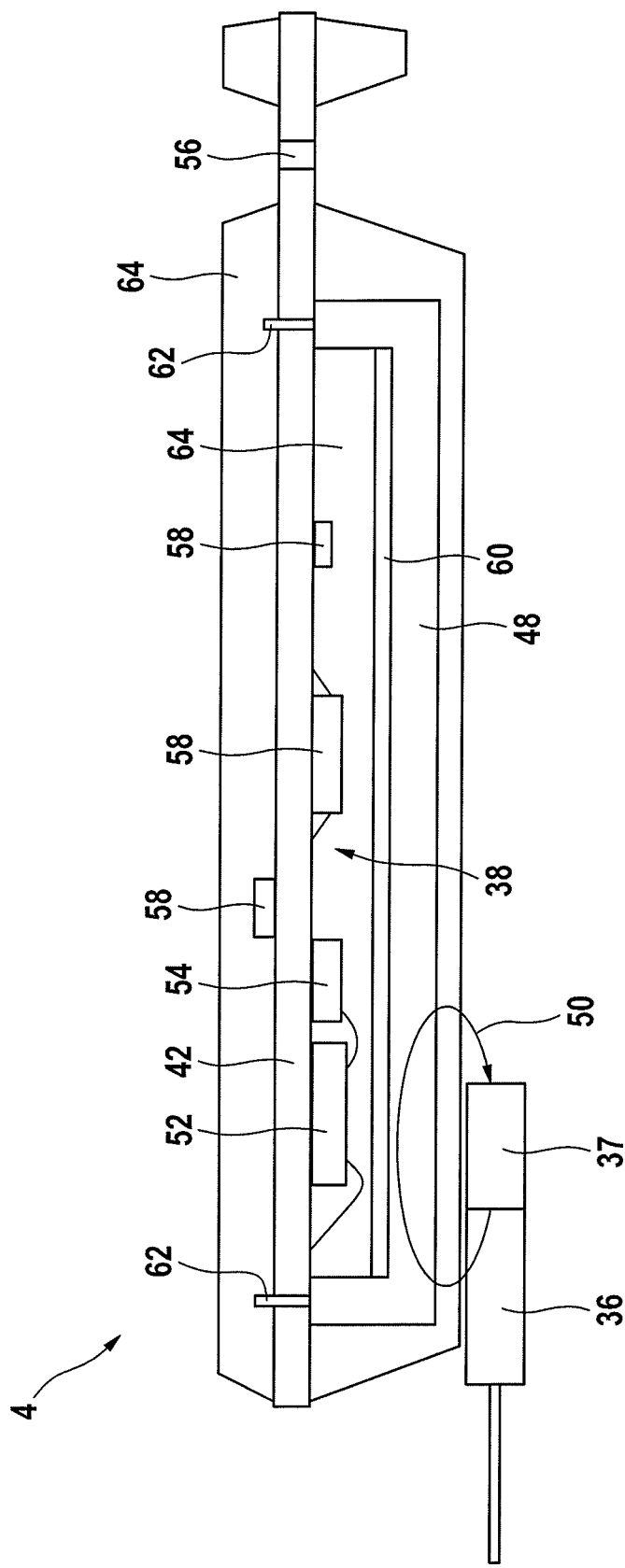
FIG. 2 shows the displacement sensor from FIG. 1.

Reference is made to FIG. 2, which shows the displacement sensor 4 from FIG. 1.

The circuit 38 of the displacement sensor comprises a transducer 48, which in the present embodiment is formed as a linear inductive position sensor, known as a LIPS. The LIPS 48 detects a magnetic field 50 of the transducer magnet 37 and on the basis of this outputs an electrical transducer signal, not referred to any more specifically, to the circuit 38. This transducer signal is transformed by a first signal processing chip 52 and a second signal processing chip 54 into a measuring signal, not referred to any more specifically, from which the position of the slide 36, and consequently the position of the flange 40 and of the primary piston 12, are obtained. The measuring signal generated in this way can finally be picked off at a transmitting interface 56 of the displacement sensor 4 by way of a cable that is not represented any further and be passed on to a higher signal processing unit that is not represented any further, such as for example an engine and/or brake control in a vehicle that is not represented any further.

The circuit 38 may comprise protective elements 58 for protecting the two signal processing chips 52, 54, for example from an overvoltage. Furthermore, arranged between the circuit 38 and the LIPS 48 may be a shielding plate 60, which shields from electromagnetic fields between the circuit 38 and the transducer 48 and thus avoids any influence of the circuit 38 on the LIPS 48.

In the present embodiment, the LIPS 48 is arranged in a defined position on the wiring carrier 42 by way of a form fit 62. In this case, a protective mass 64 surrounds the wiring carrier 42 and the transducer 48.

Figure 3:
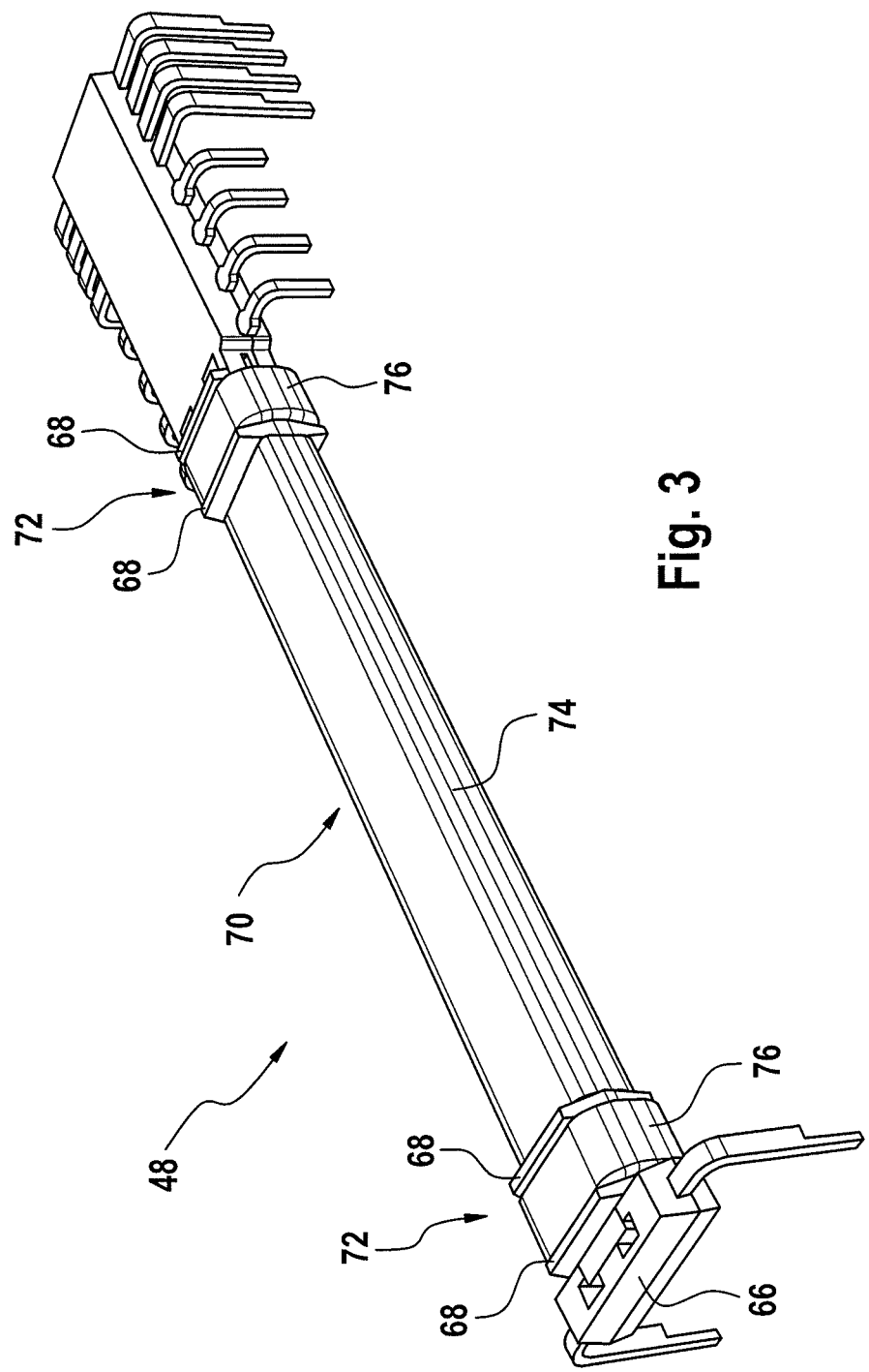
FIG. 3 shows a perspective representation of part of the displacement sensor from FIG. 2.

In FIG. 3, a perspective view of the LIPS 48 is represented. The LIPS 48 comprises a coil carrier 66 with a winding space, which is divided by way of four webs 68 into a middle portion 70 and two side portions 72. The coil carrier 66 carries a primary coil 74, which extends along a core, which cannot be seen any further in FIG. 3, and in the present case is intended to be assumed as being of one layer. At the two opposite outer zones of the primary coil 74, the coil carrier 66 carries densely wound secondary coils 76 for measuring an induction voltage.

That is to say that the coils 74, 76 in the LIPS 48 can be distinguished in two different ways. On the one hand, the coils interact as part of a measuring transformer, the primary coil 74 exciting a magnetic field and inducing the induction voltage in the secondary coils 76. The choice of the primary and secondary coils 74, 76 is in principle as desired, and does not have to be implemented in the way shown in FIG. 3. The LIPS 48 of the present embodiment is intended to be able to be evaluated by radiometric signal processing, for which reason the choice of the primary coil 74 and the secondary coils 76 is made in the aforementioned way. The signal processing connected to such a LIPS 48 performs a measurement of the induction voltage at each of both secondary coils 76 and calculates the two measured induction voltages with a suitable algorithm, which has the aim of suppressing disturbances. In the simplest case, this can be performed by a suitable series connection of the secondary coils 76. This is preferably performed by an analog or digital signal processing, which offers considerable freedom in the implementation of a mathematical model with which the position value is calculated from the two induction voltages.

Furthermore, the coils 74, 76 can be divided with regard to their geometrical form into coils 74 with a low winding density, which are wound almost along the entire length of the core (in the present exemplary embodiment of the primary coil 74), and also those that are wound compactly with a high winding density at a specific location of the core that is not shown (in the present exemplary embodiment the secondary coils 76).

Further details on the way in which a LIPS functions can be taken for example from the documents DE 44 259 03 C3, which is incorporated by reference and EP 238 922 B1, which is incorporated by reference.

In FIG. 3, the windings of the primary coil 74 in the middle portion 70 and the two side portions 72, which are divided off by the webs 68, lie on the same radius. As a result, the magnetic core, not shown any further, in the coil carrier 66 is enclosed as closely as possible by the individual coils 74, 76. This is particularly advantageous since, with a predetermined number of windings, the coils 74, 76 have the smallest length of wire, and consequently also the smallest ohmic resistance, the least material consumption and also the smallest mass and the smallest volume. Furthermore, unnecessary stray flux through the likewise enclosed air volume (or volume of the diamagnetic or paramagnetic coil carrier) is minimized. The stray flux may impair the flux linkage and lead to external fields influencing the coils 74, 76 more than necessary.

Figure 4:
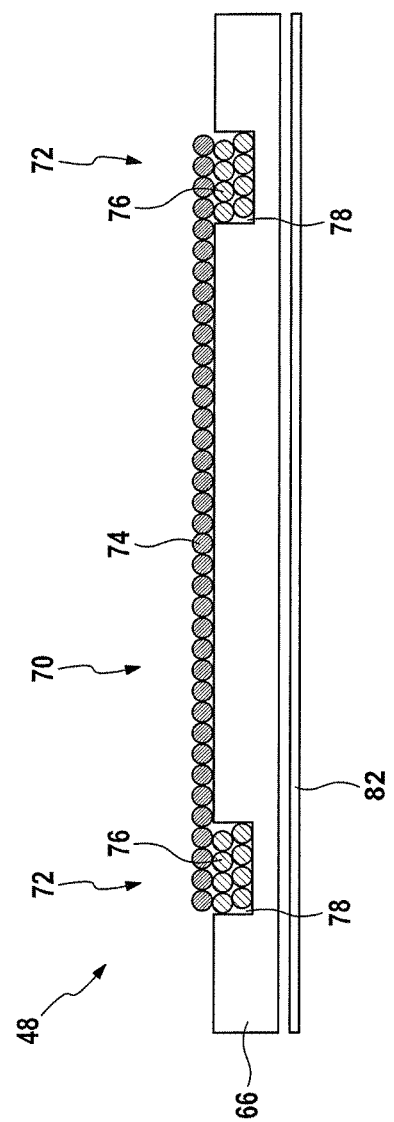
FIG. 4 shows a sectional representation of a first embodiment of the displacement sensor from FIG. 3

Reference is made to FIG. 4, which shows a sectional representation of an alternative embodiment of the LIPS 48 from FIG. 3.

The LIPS 48 shown in FIG. 4 is based on the realization that the sensor shown in FIG. 3 entails technical disadvantages in terms of production that outweigh the electrotechnical advantages.

In FIG. 4, the secondary coils 76 are wound in slots 78 or pockets. When seen in the radial direction, the secondary coils 76 completely fill their slots here. It can be seen directly that there is no difference from the solution that is shown in FIG. 3 with regard to the delimitation of the winding space of the secondary coils 76. However, the coil carrier 66 in FIG. 4 does not have narrow webs 78 that impair the robustness or durability of the workpiece or tool. When seen from the coil carrier 66, here the primary coil 74 has been wound radially onto the secondary coils 76, and thus comes to lie on the surface of the coil carrier 66 and the secondary coils 76. The surface formed jointly by the coil carrier 66 and the secondary coils 76 has in this case virtually no contours, and therefore also no impediments for a uniform winding spacing. Although the arrangement shown in FIG. 4 of the coil carrier 66, the primary coil 74 and the secondary coil 76 is not advantageous for use for inductances or transformers in general applications, it has surprisingly been possible to demonstrate experimentally that the air or coil-carrier space additionally enclosed by the primary coil 74 only has a negligible influence on the technical measuring properties of the LIPS 48 thus formed.

Figure 5:
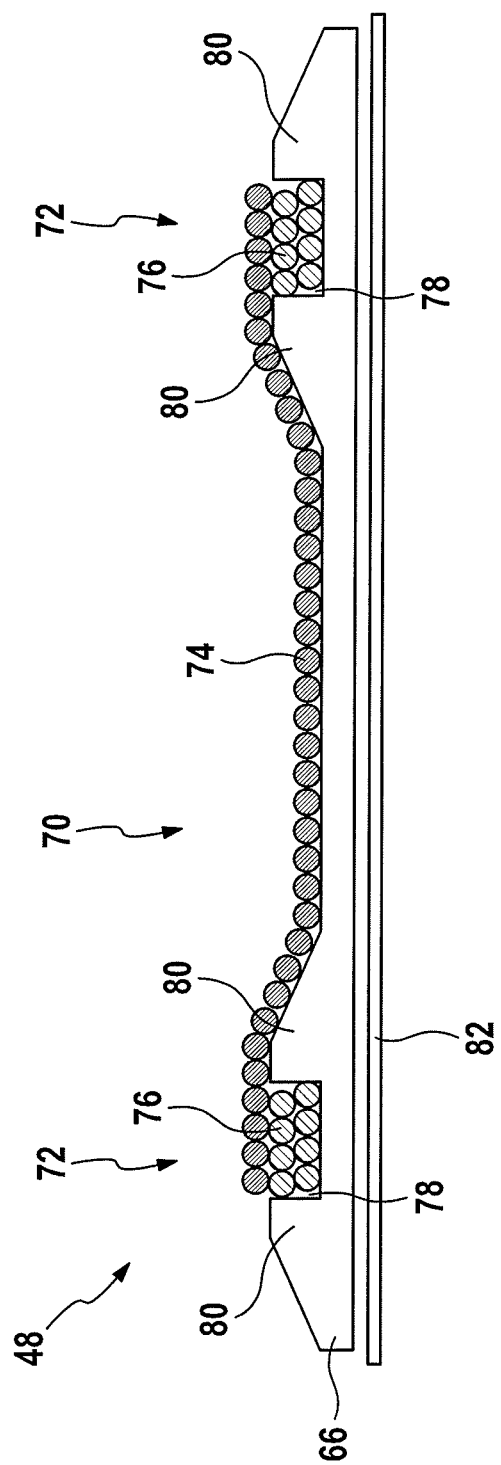
FIG. 5 shows a sectional representation of a second embodiment of the displacement sensor from FIG. 3.

Reference is made to FIG. 5, which shows a sectional representation of a further alternative embodiment of the LIPS 48 from FIG. 3.

In FIG. 5, the material consumption of the coil carrier is minimized, with otherwise the same properties of the LIPS 48 in comparison with the LIPS from FIG. 4. The greater radius of the primary coil 74 in FIG. 4 in comparison with FIG. 3 is reduced on average in FIG. 5, because ramps 80 of the winding of the primary coil 74 make it possible to adopt various radii. The slope of the ramps should in this case be made to match the winding process of the primary coil 74.

To be certain of avoiding slipping or sliding away of the windings of the primary coil 74 into the range of smaller radii, a step-shaped structure could also be provided instead of the ramps 80. Alternatively, the region of the ramps 80 may be embodied with a rough surface, in order that the windings can be supported locally on the unevennesses.

All of the variants of the LIPS 48 that are represented could optionally be embodied as bodies of revolution. An alternative would however be possible with a cross section of the magnetic core 82 shown in FIGS. 4 and 5 in the form of a polygon, an ellipse or some other form for example of the coil carrier 66 to which a winding can be applied.

Moreover, the section represented in FIGS. 4 and 5 could not be present over the entire circumference of the LIPS 48, as FIG. 3 already shows: to achieve the aim of a multi-layered winding for the secondary coils 76, for example with a rectangular cross section of the winding assembly, it is enough if the webs 68, and consequently also the slots 78 or pockets, are present in partial regions of the overall circumference of the LIPS 48. The winding wires generally do not in any case allow the windings to deviate appreciably from the predetermined form if there is no delimitation in the form of webs 68 or slots 78 in partial regions of the circumference.

The sections shown in FIGS. 4 and 5 should therefore only be regarded by way of example as a rotationally symmetrical form of the LIPS 48. Alternatively, the LIPS 48 could also take the form shown in FIGS. 4 and 5 when there is at least one section through the coil body 66 that corresponds to one of the forms represented, while all of the other possible sections through the coil body 66, i.e. at other angles to the circumference, may have a differently contoured cross section, in particular an uncontoured body.

Only the possibility of the contour of the coil body 66 containing thin webs 68 at these other angles to the circumference should be ruled out, because this could stand in the way of a robust construction that is suitable for production.

The invention claimed is:

1. A sensor for detecting a position of a transducer magnet in a direction of movement, comprising:
    a coil carrier, which extends in the direction of movement,
    a first coil, which extends in the direction of movement and is wound up on the coil carrier, and
    a second and a third coil, which are aligned according to the first coil and are wound up on the coil carrier, so that the second and third coils correspondingly form with the first coil a first and a second transformer, the transformation ratio of which is dependent on the position of the transducer magnet,
    at least the second or third coil being arranged such that the coil carrier is positioned on a first side of the second or third coil and the first coil is positioned on a second side of the second or third coil opposite the first side.

2. The sensor as claimed in claim 1, wherein the coil carrier comprises a main body which extends in the direction of movement and has a first and a second slot, which runs at least in certain regions in the circumferential direction around the direction of movement and in which the second and the third coil is correspondingly accommodated.

3. The sensor as claimed in claim 2, wherein the second and third coils fill their corresponding slot up to an outer lateral surface of the main body, so that the second and third coils finish flush with the outer lateral surface of the main body.

4. The sensor as claimed in claim 2, wherein the main body comprising a recess, which runs at least in certain regions in the circumferential direction around the direction of movement and is formed between the slots when viewed in the direction of movement.

5. The sensor as claimed in claim 4, a surface of the main body being formed at an obtuse angle when considered in the direction of movement.

6. The sensor as claimed in claim 1, the second and third coils being compactly wound coils in comparison with the first coil.

7. The sensor as claimed in claim 1, the second coil and the third coil are arranged between the coil carrier and the first coil.

8. The sensor as claimed in claim 1, the coil carrier (being produced from plastic, by an injection-molding process.

9. A device for actuating a brake system of a vehicle, comprising a brake pedal for setting a braking force by displacing the brake pedal in a direction of movement and a sensor according to claim 1 for detecting the position of the brake pedal in the direction of movement and for outputting a signal indicating the braking force to be set, in dependence on the detected position of the brake pedal.

10. A method for producing a sensor as claimed in claim 1, comprising:
    winding the second and third coils onto the coil carrier, and
    winding the first coil onto the coil carrier over the second and third coils wound onto the coil carrier such that the coil carrier is positioned on the first side of the second and third coils and the first coil is positioned on the second side of the second and third coils opposite the first side.

11. The sensor as claimed in claim 3, wherein the main body comprising a recess, which runs at least in certain regions in the circumferential direction around the direction of movement and is formed between the slots when viewed in the direction of movement.

* * * * *